Dec. 23, 1969    C. M. SHEKRO    3,486,097
AUTOMATIC SHAFT POSITIONING A.C. DYNAMIC BRAKE
Filed May 3, 1967    6 Sheets-Sheet 1

INVENTOR.
CHRISTE M. SHEKRO
BY
ATTORNEYS.

United States Patent Office 3,486,097
Patented Dec. 23, 1969

1

3,486,097
AUTOMATIC SHAFT POSITIONING A.C. DYNAMIC BRAKE
Christe M. Shekro, Cincinnati, Ohio, assignor to Avco Corporation, Cincinnati, Ohio, a corporation of Delaware
Filed May 3, 1967, Ser. No. 635,920
Int. Cl. H02p 3/26
U.S. Cl. 318—203    11 Claims

ABSTRACT OF THE DISCLOSURE

The several described embodiments of this invention each includes an alternating current, 3-phase induction motor dynamically braked by means of a plurality of relay-operated switches which connect the alternating current source to the motor windings through a series-connected resistor and a rectifier to develop a direct current braking torque. As the motor slows down, the braking torque and the deceleration rate decrease. To maintain or to increase the torque to a safe maximum level, a speed-responsive element reduces the resistance as a function of speed so that the direct current, and hence the braking torque, is increased as the speed of the motor reduces. The stopping point of the shaft is controlled by a shaft position sensitive element which initiates a final highest torque braking step. The system is automatically reset for the next sequence.

Summary of the invention

Broadly, this invention uses controlled dynamic braking in combination with speed-responsive elements for altering braking torque as a function of speed to achieve a practical safe maximum permissible braking rate throughout the braking cycle. Initially the motor is decelerated with moderate torque. As the motor slows down, the braking torque would normally decrease and the motor would decelerate at a reduced rate. To maintain a practical maximum deceleration rate, the braking torque is increased one or more times, or continuously, as a function of the reduction in shaft speed. Upon actuation of the braking system, the motor is decelerated by the application of moderate braking torque. The braking torque is then increased either continuously or when certain reduced angular velocities are reached. At a predetermined low speed, a position-sensing device initiates a final maximum braking torque step to bring the system abruptly to rest. Thus, the motor is stopped in the shortest possible time, and at a predetermined angular position.

The prior art

Dynamic braking of D.C. motors is known. It involves an electro-mechanical system which effectively forces the D.C. motor to act as a generator and thus to absorb the rotational energy. It is also known, but not widely used, that an induction motor can be dynamically braked by rectifying the power supplied to the motor, thereby producing direct current passing through the primary winding of the A.C. motor and producing a torque in opposition to rotation. This invention takes advantage of the known prior art A.C. dynamic braking systems, but provides an improved arrangement for stopping the motor at a relatively constant safe maximum deceleration rate, and for stopping the motor at a predetermined shaft position.

The drawings

FIGURE 2 is a graph showing the sequences of operation of FIGURE 1;

Complete description of the invention—first embodiment

Figure 1:
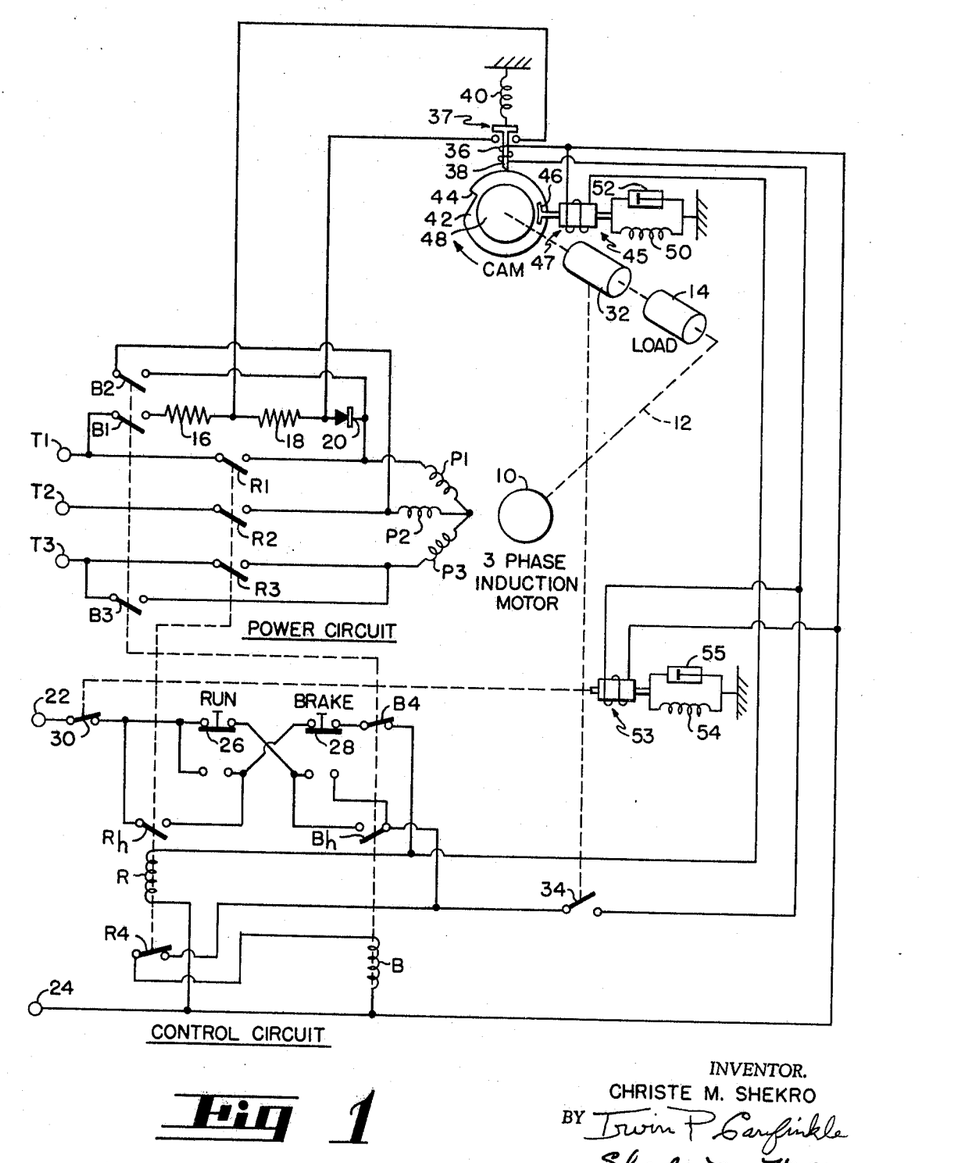
FIGURE 1 is a schematic representation of one embodiment of this invention.

FIGURE 1 of the drawings shows a braking system for a 3-phase induction motor 10 having a shaft 12 for driving a load 14, for example, a radar antenna subdish. The system rapidly stops the shaft 12 and the load 14 at a predetermined angular position.

The 3-phase induction motor 10 is conventional and includes three primary windings P1, P2, and P3. The winding P1 is connected to the terminal T1 of a 3-phase power supply (not shown) through running switch R1, while the windings P2 and P3 are connected to terminals T2 and T3 of the 3-phase power supply through running switches R2 and R3, respectively. The running switches R1, R2, and R3 are mechanically coupled to a running relay R which, when energized, serves to maintain the running switches R1, R2, and R3 in a closed position. When de-energized, the relay R opens these three running switches.

Two resistors 16 and 18 and a diode 20 are connected in series to the terminal T1 through a braking switch B1. A second braking switch B2 connects the windings P1 and P2 in parallel, and a third braking switch B3 connects the winding P3 to the terminal T3. The braking switches B1, B2, and B3 are mechanically coupled to a braking relay B which, when energized, serves to close them. De-energization of the relay B opens them. The braking switches B1, B2, and B3 are open when the running switches R1, R2, and R3 are closed, and vice versa.

For energizing either the running relay R or the braking relay B, the system includes an arrangement of switches for selectively connecting these relays to the terminal 22 and the terminal 24 of a voltage supply (not shown). The voltage supply may be either A.C. or D.C., depending on what is available. The switching arrangement includes two 2-pole, break-make push-button switches 26 and 28, both being normally spring biased to the position shown. The switch 26, when depressed, connects the running relay R into the circuit while the switch 28, when depressed, connects the braking relay B. The switching arrangement also includes a running holding switch Rh and a braking holding switch Bh. The switch Rh is mechanically coupled to the relay R, and is closed when the relay R is energized. Similarly, the switch Bh is mechanically connected to the relay B and is closed when the relay B is energized. The switching arrangement also includes running switch R4 mechanically connected to the relay R and a braking switch B4 mechanically coupled to the relay B. Both of these switches act oppositely from the remaining running and braking switches in that these switches are opened by the energization of the relays R and B, respectively, and closed by the de-energization of those relays. The switch 30 is provided for resetting the circuit after a completed sequence.

Depressing the armature of the running push-button switch 26 completes a circuit from the terminal 22 through the closed reset switch 30, the lower terminals of the switch 26, the upper terminals of the switch 28, and the initially closed switch B4 through the running relay R to the terminal 24. This circuit connection energizes the running relay R. Energization of relay R closes switches R1, R2, R3, and Rh and opens R4. Closing the holding switch Rh holds the running relay R in an energized state. Closing of the switches R1, R2, and R3 connects the source of energization to the 3-phase induction motor 10 which turns the load 14 at an angular velocity $W_0$ (see FIGURE 3). Braking relay B is not energized, and thus the switches B1, B2, B3, and Bh are open while the switch B4 is closed. Referring to FIGURE 2, the various switches are now in the states shown at time $t_1$.

Figures 3, 4:
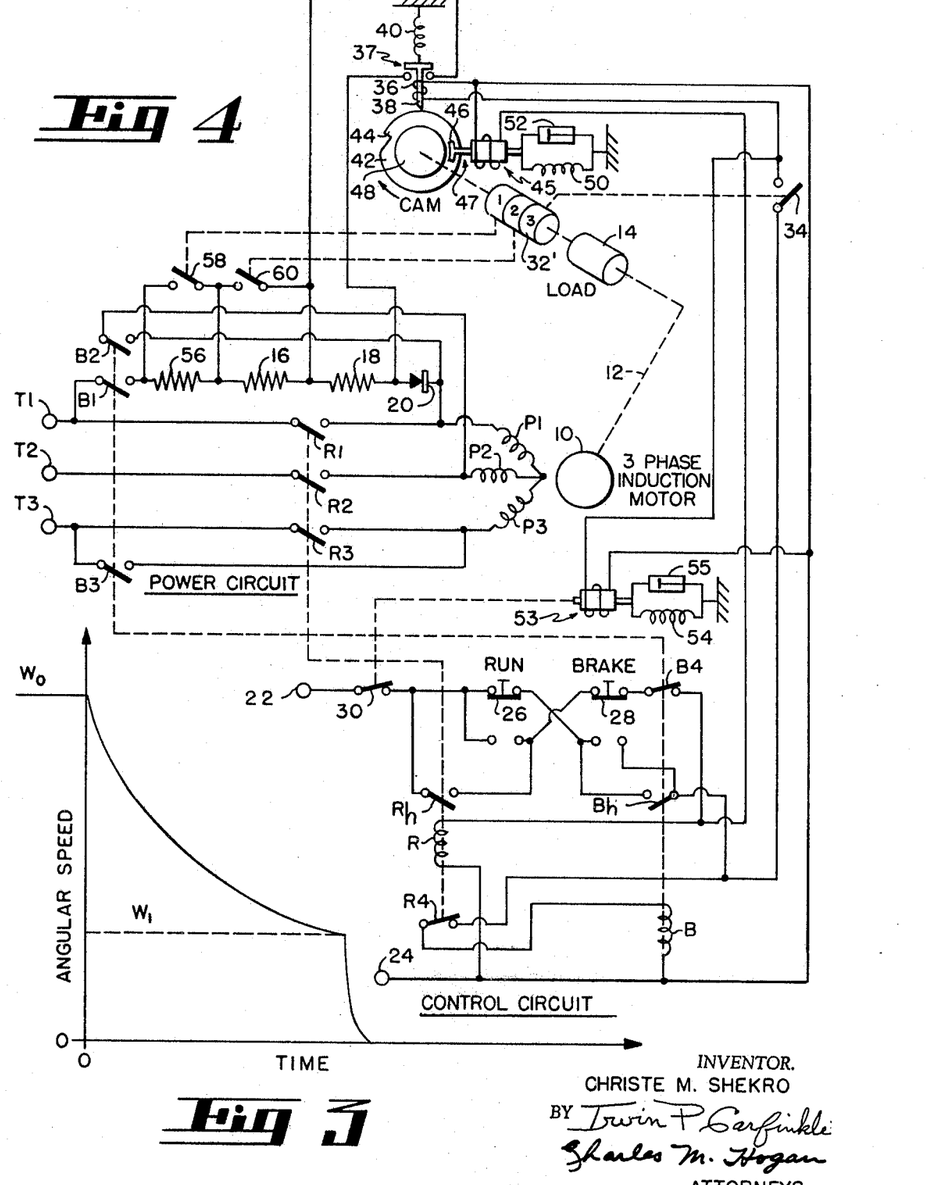
FIGURE 3 is a curve showing the angular velocity versus time characteristics of the system during braking.
FIGURE 4 is a schematic representation of the second embodiment of this invention.

When it is desired to brake the motor, the armature of the braking switch 28 is depressed, breaking the running relay circuit and completing a circuit from the terminal 22 through the switch 30, the upper terminals of the switch 26, the lower terminals of the switch 28, the now closed running switch R4, and the braking relay B to the terminal 24. Energization of the braking relay B opens the braking switch B4, thereby maintaining the running relay circuit open and opening the running switches R1, R2, R3, and the holding switch Rh. The braking relay B also closes the braking switches B1, B2, and B3 to connect the resistors 16 and 18 and the diode 20 into the braking mode with the motor windings. The closing of switch Bh holds the relay B energized. At this time the switches are in the state indicated in FIGURE 2 at $t_2$ and the motor begins to decelerate at a low rate as shown in FIGURE 3.

The motor 10 drives a centrifugal governor device 32 which mechanically closes a switch 34 at time $t_3$ when the angular velocity of the shaft 12 is below a predetermined rate $W_1$. Closing the switch 34 energizes windings 36 of a solenoid 37 by a connection across the braking relay B. This causes plunger 38 of solenoid 37 to bear, in opposition to the force of a spring 40, against the surface of a cam 42 having a notch 44. Notch 44 is indexed to a predetermined angular position at which it is desired to stop the shaft 12. As the notch 44 in the cam 42 passes under the plunger 38, the plunger advances, closing the contacts on the solenoid 37 at time $t_4$ and thereby short-circuiting resistor 18 out of the circuit. This causes increased current flow through the windings P1, P2, and P3, and results in an increased braking torque which serves to bring the system abruptly to rest at time $t_5$.

The system also includes a mechanical brake generally indicated at 45. The brake 45 includes a solenoid 47 having a brake shoe armature 46 which acts upon a brake drum 48 on the shaft 12. A spring 50 biases the brake shoe armature toward the drum 48, but is opposed by energization of the solenoid 47 and a dashpot 52. Solenoid 47 is energized by a connection across the running relay R and it maintains the brake shoe armature 46 out of contact with the brake drum 48. However, when the braking relay B is energized at time $t_6$, power to the solenoid 47 is disconnected and the spring 50, now acting against the dashpot 52, forces the brake against the shaft after a period of time (see FIGURE 2) greater than the time required for the shaft to come to rest. This time period is established by the dashpot 52.

Reset is accomplished at time $t_7$ by a timer relay 53 which is energized simultaneously with the solenoid 37 (when the switch 34 closes). The timer relay is spring loaded by a spring 54 and includes a mechanical time delay, for example, a dashpot 55. It is mechanically connected to reset switch 30. When the timer relay is energized, it opens the switch 30 for a short interval and then closes it again. The action resets the system and also de-energizes the timer relay at time $t_8$.

This system is highly advantageous for several reasons. With the shaft rotating at high speed, for example, $W_0$, the system has large kinetic energy which could virtually destroy itself if the braking forces are excessive. Therefore, a limit to the maximum braking effort must be established. Referring to FIGURE 3, the deceleration rate at the initiation of the braking cycle is at a preestablished safe maximum. The rate decreases exponentially toward zero. However, when an angular velocity of $W_1$ is achieved, the resistor 18 is shorted out and the braking torque is again increased, again establishing a maximum permissible deceleration rate.

Once the shaft has been decelerated to the speed $W_1$, the exact final position of the shaft can be determined with considerable accuracy in accordance with the equation:

$$T\theta = \tfrac{1}{2} I W^2$$

where

T = braking torque
$\theta$ = angle of travel
I = system equivalent polar moment of inertia
W = angular speed.

Since the braking torque is made very large when the resistor 18 is short-circuited, and since the system kinetic energy is very low at low speeds, the angle of travel $\theta$ becomes very small and, in practical case, is essentially zero for absorbing the final kinetic energy of the system. Thus, the final braking effort brings the system to a complete stop at a predetermined position in a very short time.

Second embodiment

The embodiment of FIGURE 4 involves essentially the same concepts as that of FIGURE 1 with the exception that FIGURE 4 provides controlled deceleration in multiple steps. Whereas in FIGURE 1 deceleration occurs at a decreasing rate until the low speed $W_1$ is achieved at which point the braking torque is increased, in FIGURE 4 the braking torque is increased at a plurality of speeds so as to maintain the deceleration rate more nearly constant throughout the braking cycle. Therefore, the system of FIGURE 4 permits braking at essentially the safe maximum rate throughout the entire braking cycle, and therefore stopping at a predetermined position is accomplished in the shortest possible time. The concept of FIGURE 4 is particularly useful in cases involving large kinetic energy such as in high inertia or high velocity systems.

Figure 5:
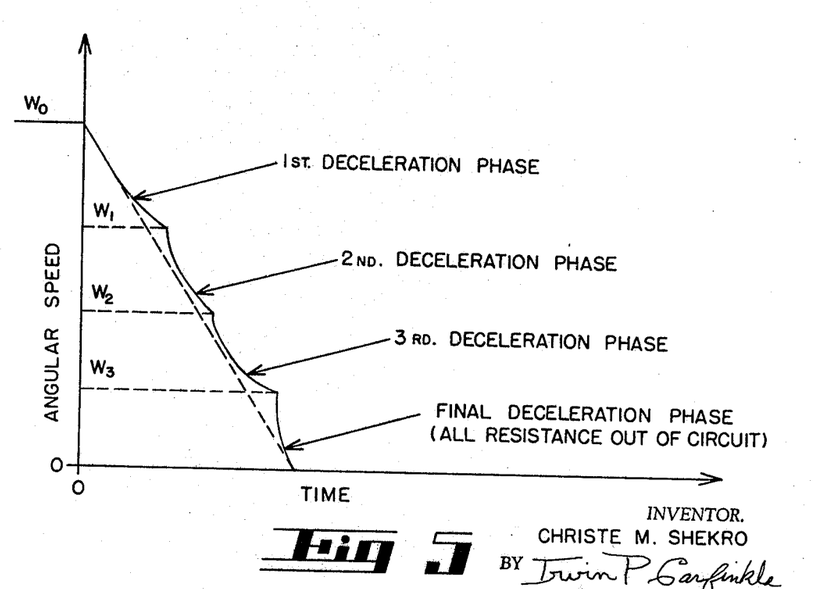
FIGURE 5 is a curve showing the angular velocity versus the time characteristics during braking of the embodiment illustrated in FIGURE 4.

The embodiment of FIGURE 4 differs from FIGURE 1 in that an additional resistor 56 is connected in series with the resistors 16 and 18 and the diode 20. Also, the centrifugal governor device 32' not only serves to close the switch 34 at a predetermined speed, but also serves to close the additional switches 58 and 60 at other predetermined speeds. FIGURE 5, which represents the angular speed versus time characteristic of the system, shows the four steps of deceleration achievable in the FIGURE 4 embodiment. In the first deceleration phase all three resistors 56, 16, and 18 are in circuit and the system decelerates at a given rate which is a function of velocity and therefore is decreasing exponentially. At a predetermined speed $W_1$, resistor 56 is short-circuited out by the first section of the centrifugal governor device 32'. At speed $W_2$ the second section of the centrifugal device 32' shorts out the resistor 16. At speed $W_3$ the third section of the centrifugal device 32' operates the switch 34, and thereafter the system functions in the same manner as the embodiment of FIGURE 1.

In FIGURE 5 the dotted line represents a constant deceleration rate. It can readily be observed that the actual deceleration rate follows closely along the dotted line. It is apparent, therefore, that the embodiment of FIGURE 4 represents an improvement over the embodiment of FIGURE 1 in that the safe maximum deceleration rate is maintained throughout the entire braking cycle.

Third embodiment

Figure 6:
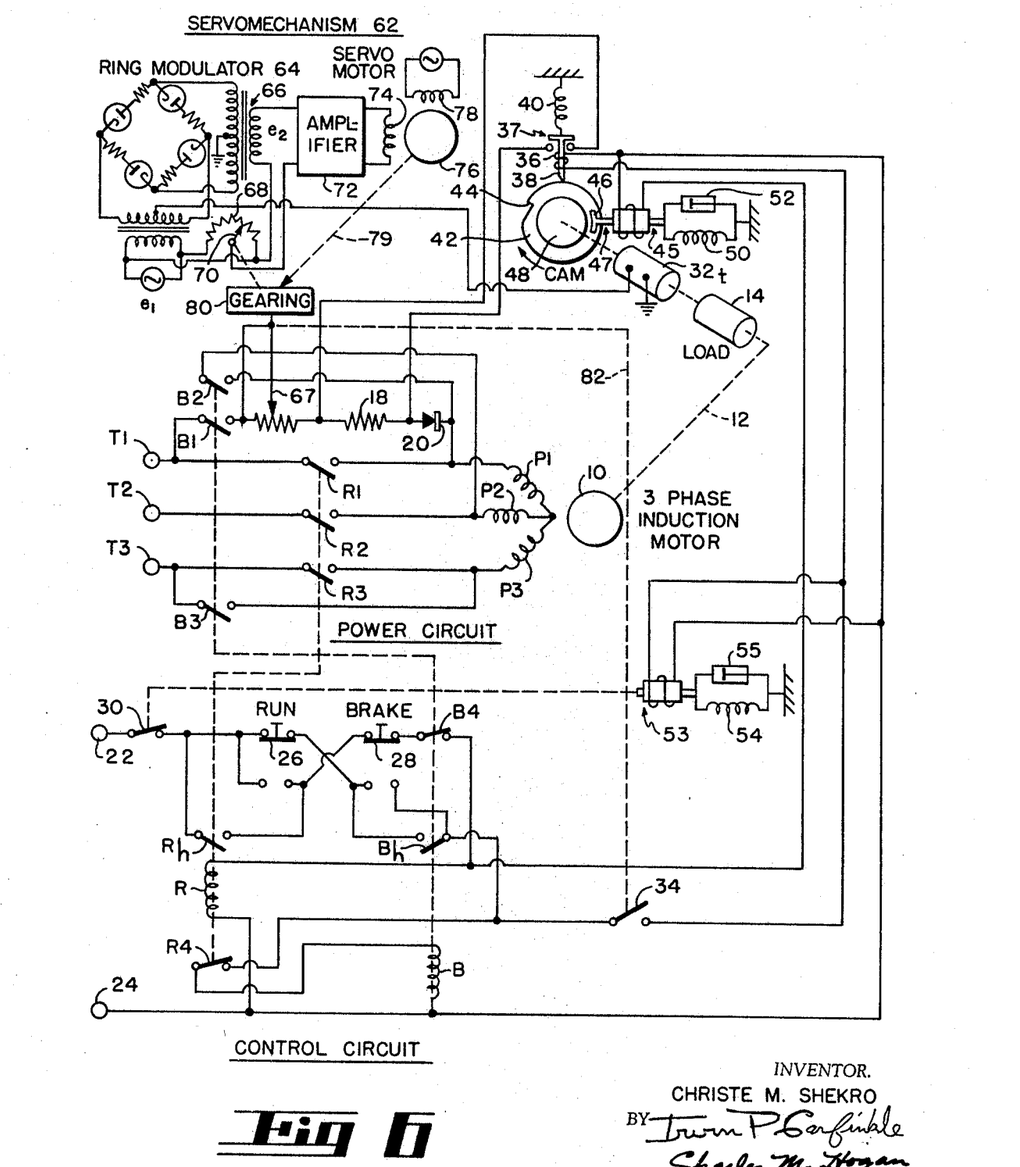
FIGURE 6 is a third embodiment of this invention providing a continuously variable braking torque for providing a constant deceleration rate over a portion of the braking cycle.

A third embodiment of this invention is illustrated in FIGURE 6 which utilizes essentially the same concepts as that of FIGURE 1 with the exception that the deceleration rate is maintained constant by means of a servo mechanism for continuously decreasing the resistance in series with the diode. This embodiment actually represents a refinement over the embodiment of FIGURE 4 in that an infinite number of steps can result in a truly constant deceleration rate whereas FIGURE 4 uses a discrete number of resistors for approaching the same end results. As previously mentioned, the dynamic braking effort for any fixed current in the stator windings is proportional to angular speed so that braking torque reduces as speed reduces. To maintain constant braking torque, the current must be increased continuously in such a fashion that the resulting gain in braking torque exactly compensates for the loss of torque due to speed decay.

In FIGURE 6 instead of a centrifugal speed device a tachometer $32_t$ is used to produce a D.C. output voltage having a magnitude proportional to speed. This D.C. voltage provides the control voltage for a servo mechanism 62. The servo mechanism 62 includes a conventional ring modulator 64 provided with an alternating current control voltage $e_1$. The direct voltage supplied from the tachometer $32_t$ is also applied to the ring modulator 64 so that the output at the secondary winding of output transformer 66 is an alternating voltage $e_2$ having a magnitude proportional to the direct current output of the tachometer $32_t$. The voltage $e_1$ is connected in series opposition with voltage $e_2$ through a potentiometer 68 having a movable tap 70. The difference between the voltage $e_1$ and the voltage $e_2$ is applied through an amplifier 72 to one winding 74 of an induction motor 76. The other winding 78 of the induction motor is supplied by an alternating current of the same frequency but in quadrature to the amplified voltage $e_2$.

Any difference between the voltages $e_1$ and $e_2$ results in a rotation of induction motor 76 which is coupled through a shaft 79 to gearing 80. The gearing 80 serves to drive the tap 70 of the potentiometer 68 in such a direction as to null the error. The gearing 80 also drives the tap 67 of potentiometer 68 in a direction to reduce the resistance in series with the diode 20. When the tap 67 reaches the end of its travel, the switch 34 is closed by means of a mechanical connection 82 and the system thereafter functions in a manner identical to that of the embodiment of FIGURE 1.

Thus, the servo arrangement of FIGURE 6 provides a constant frequency alternating current signal output $e_2$ whose magnitude is a function of shaft speed and a reference voltage $e_1$ in opposition thereto. The amplified voltage difference between voltages $e_1$ and $e_2$ provides one of the voltages for the 2-phase servo motor which drives the tap 70 of the rheostat 68 in a direction to null the difference. Thus, the tap 70 is driven in accordance with speed.

Figure 7:
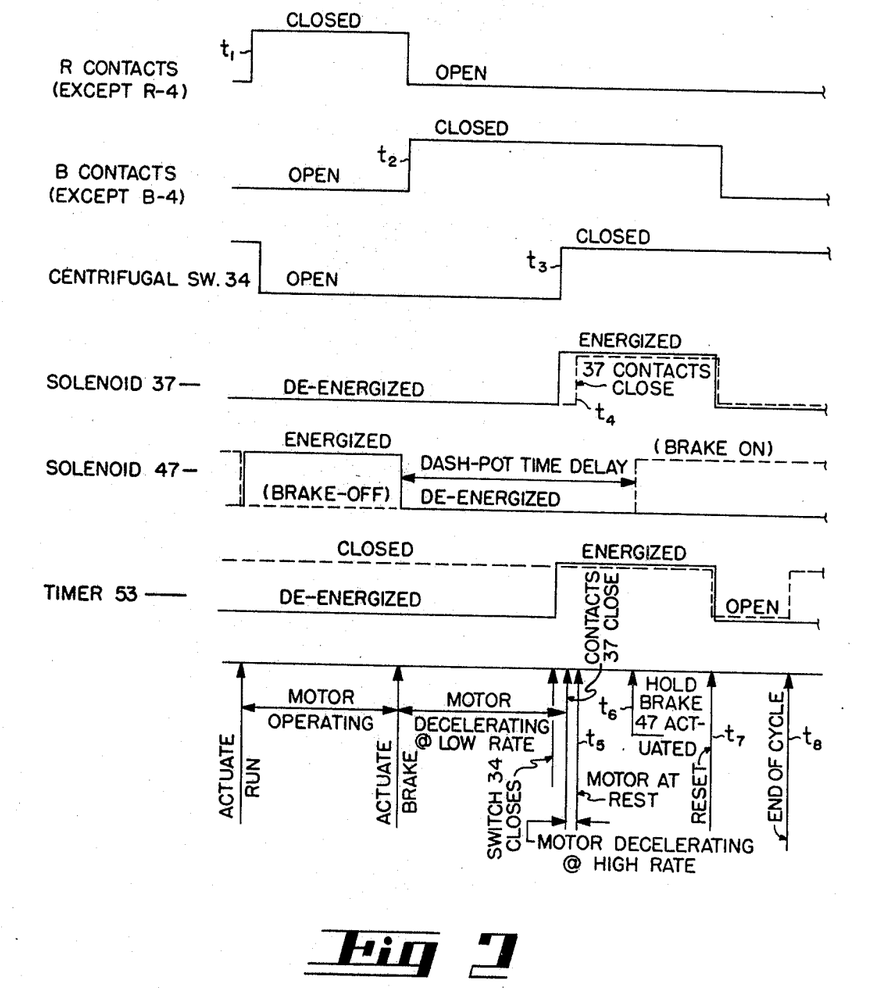
FIGURE 7 is a curve showing the angular velocity versus time characteristics during braking of the embodiment of FIGURE 6.

For constant deceleration, the rheostat must be made non-linear for producing the exact torque compensation. The angular speed versus time characteristic of the FIGURE 6 embodiment is shown in FIGURE 7, in which it is seen that the speed reduces at a constant rate from $W_0$ to $W_1$, at which time the switch 34 is closed and the final deceleration takes place in accordance with the FIGURE 1 embodiment.

Fourth embodiment

Figure 8:
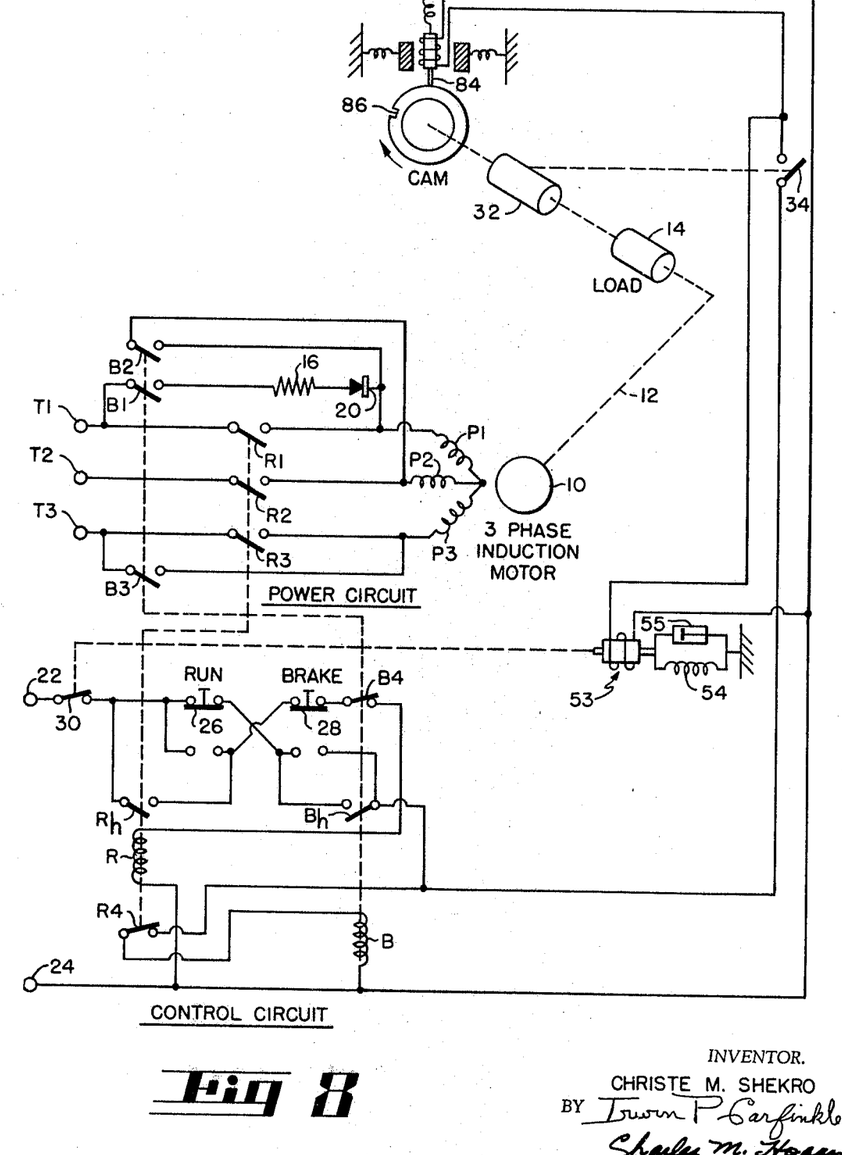
FIGURE 8 is a fourth embodiment of this invention.

FIGURE 8 illustrtaes a fourth and simplified version of the invention which is useful in applications where high inertia forces are not encountered at low speeds. This embodiment differs from FIGURE 1 in that the resistor 18 is eliminated. In addition, the notch 44 is replaced by a detent 86 into which a plunger 84 drops when the switch 34 is actuated. Unlike the notch 44 which permits additional travel of the shaft, the detent 86 causes the shaft to stop immediately.

The FIGURE 8 embodiment obviously would not be suitable for systems in which a very heavy load is being driven, and in any case the switch 34 must not be closed until such time as the speed of the shaft is reduced sufficiently to permit abrupt stopping by means of the plunger and notch arrangement.

In addition to the foregoing embodiments, it will be apparent to persons skilled in the art that the invention is capable of many modifications and adaptations. It is intended therefore that this invention be limited only by the following claims as read in the light of the prior art.

I claim:

1. In a braking system for stopping the shaft of an induction motor at a predetermined angular position, said induction motor having primary windings and a short circuited secondary winding, the combination comprising:

a source of alternating current supply;
　first switch means for connecting said primary windings of said motor to said source of supply;
　a rectifier;
　second switch means for connecting said primary windings to said source through said rectifier, said first switch means being closed and said second switch means being open, whereby said primary windings are energized and the shaft of said motor is rotated;
　brake control means for simultaneously opening said first switch means and closing said second means, whereby said primary windings are supplied with direct current through said rectifier and said motor is dynamically braked; and
　additional means responsive to the angular velocity of said shaft below a predetermined rate for stopping said shaft at said predetermined position, said additional means including:
　　a centrifugal device affixed to said shaft;
　　a switch closed in response to a decrease in angular velocity of said centrifugal device;
　　a relay energized in response to the closing of said switch;
　　a cam affixed to said shaft, said relay having a plunger normally spring biased away from said cam, the closing of said switch energizing said relay to drive said plunger against said cam; and
　　a reduced diameter portion on said cam at said predetermined angular position for receiving said plunger.

2. In a braking system for stopping the shaft of an induction motor at a predetermined angular position, said induction motor having primary windings and a short circuited secondary winding, the combination comprising:

a source of alternating current supply;

first switch means for connecting said primary windings of said motor to said source of supply;
a rectifier;
second switch means for connecting said primary windings to said source through said rectifier, said first switch means being closed and said second switch means being open, whereby said primary windings are energized and the shaft of said motor is rotated;
brake control means for simultaneously opening said first switch means and closing said second switch means, whereby said primary windings are supplied with direct current through said rectifier and said motor is dynamically braked; and
additional means responsive to the angular velocity of said shaft below a predetermined rate for stopping said shaft at said predetermined position, said additional means including:
 a cam on said shaft, said cam having a notch located on its periphery at said predetermined position;
 a relay-operated plunger for engaging said notch to positively stop said cam and said shaft at said notch, said relay being normally spring biased away from said cam;
 a D.C. voltage source, said relay being connected to said source through a normally open switch; and
 a centrifugal device on said shaft, said centrifugal device being coupled to said switch for closing said switch when the velocity of said shaft is below said predetermined rate, whereby said plunger is forced against the surface of said cam and enters said notch at said predetermined position.

3. In a braking system for stopping the shaft of an induction motor at a predetermined angular position, said induction motor having primary windings and a short circuited secondary winding, the combination comprising:
a source of alternating current supply;
first switch means for connecting said primary windings of said motor to said source of supply;
a rectifier;
second switch means for connecting said primary windings to said source through said rectifier, said first switch means being closed and said second switch means being open, whereby said primary windings are energized and the shaft of said motor is rotated;
brake control means for simultaneously opening said first switch means and closing said second switch means, whereby said primary windings are supplied with direct current through said rectifier and said motor is dynamically braked; and
additional means responsive to the angular velocity of said shaft below a predetermined rate for stopping said shaft at said predetermined position, said additional means including:
 a potentiometer in series with said rectifier, said potentiometer having a movable tap;
 a motor for driving said tap;
 means for energizing said motor; and
 means responsive to the velocity of said shaft for controlling the energization of said motor to drive said tap to reduce said impedance as a function of velocity.

4. The invention as defined in claim 1, and a resistor in series with said rectifier; and means cooperating with said plunger for short circuiting said resistor when said plunger is received in said reduced diameter portion.

5. The invention as defined in claim 4, and mechanical brake means, said brake means being applied for holding said shaft after said shaft is stopped.

6. The invention as defined in claim 5, and means for de-energizing said relay after said mechanical brake means is applied.

7. The invention as defined in claim 2, wherein a resistor is connected in series with said rectifier; and an open switch connected across said resistor, said switch being closed by said plunger when said plunger enters said notch, whereby said resistor is short circuited.

8. In a braking system for stopping the shaft of an induction motor at a predetermined angular position, said induction motor having primary windings and a short circuited secondary winding, the combination comprising:
a source of alternating current supply;
first switch means for connecting said primary windings of said motor to said source of supply;
a rectifier and a resistive impedance;
second switch means for connecting said primary windings to said source of supply through said resistor and said rectifier, said first switch means being closed and said second switch means being open, whereby said primary windings are energized and the shaft of said motor is rotating;
braking control means for simultaneously opening said first switch means and closing said second switch means, whereby said primary windings are supplied with direct currents through said rectifier and said impedance and said motor is dynamically braked; and
additional means responsive to the angular velocity of said shaft below a predetermined rate and adjacent said predetermined angular position for short circuiting at least a portion of said resistor, whereby at the said predetermined velocity the direct current through said primary windings is increased, thereby stopping said motor at said predetermined position.

9. The invention as defined in claim 8 wherein said additional means includes:
a centrifugal device attached to said shaft;
a switch closed in response to a decrease in angular velocity of said shaft;
a relay energized in response to the closing of said switch;
a cam affixed to said shaft, said relay having a plunger normally spring biased away from said cam, the closing of said switch energizing said relay to drive said plunger against said cam;
a reduced diameter portion on said cam at said predetermined angular position for receiving said plunger;
an open switch connected across said impedance; and
means when said plunger is received in said reduced diameter portion for closing said switch and thereby short circuiting said impedance.

10. The invention as defined in claim 8 wherein said resistive impedance comprises a plurality of resistors connected in series and wherein said resistors are successively short circuited by said additional means at successively lower predetermined angular velocities of said shaft.

11. The invention as defined in claim 10 wherein said additional means includes:
a relay connected to a source of energizing voltage through one normally open switch;
a cam affixed to said shaft, said relay having a plunger normally spring biased away from said cam, the closing of said one switch energizing said relay to drive said plunger against said cam, said cam having a reduced diameter portion at said predetermined angular position for receiving said plunger;
a plurality of normally open switches, each of said plurality of switches being connected across a respective one of said plurality of resistors, one of said plurality of normally open switches being closed when said plunger is received in said reduced diameter portion of said cam; and
a centrifugal device affixed to said shaft, each of the remaining of said plurality of switches and said one switch being successively closed in response to predetermined decreases in angular velocity of said centrifugal device, said one switch being the last to close, whereby said relay is energized at a low speed and whereby said shaft is stopped at said predetermined angular position.

References Cited

UNITED STATES PATENTS

| | | | |
|---|---|---|---|
| 2,534,423 | 12/1950 | Douglas et al. | 318—212 |
| 2,674,707 | 4/1954 | De Mott. | |
| 2,805,376 | 9/1957 | Evans et al. | 318—212 |
| 3,249,841 | 5/1966 | Liebenthal | 318—380 |
| 3,250,975 | 5/1966 | Pepper | 318—229 |
| 2,733,393 | 1/1956 | Carlisle | 318—371 |
| 3,209,225 | 9/1965 | Choudhury | 318—212 |

B. DOBECK, Primary Examiner

K. L. CROSSON, Assistant Examiner

U.S. Cl. X.R.

318—212, 371, 380